UNITED STATES PATENT OFFICE.

SAMUEL PEACOCK, OF CHICAGO, ILLINOIS, ASSIGNOR TO E. I. DU PONT DE NEMOURS POWDER COMPANY, A CORPORATION OF NEW JERSEY.

PROCESS OF PRODUCING AMMONIA.

1,031,582.     Specification of Letters Patent.     Patented July 2, 1912.

No Drawing.     Application filed September 23, 1911. Serial No. 650,974.

*To all whom it may concern:*

Be it known that I, SAMUEL PEACOCK, a citizen of the United States, residing at Chicago, in the county of Cook and State of Illinois, have invented certain new and useful Improvements in Processes of Producing Ammonia; and I do hereby declare the following to be a full, clear, and exact description of the invention, such as will enable others skilled in the art to which it appertains to make and use the same.

This invention relates to the production of ammonia gas $NH_3$ from a nitrid having the formula $Al_2C_3N_6$, and has for its object to provide a process which will be simple and efficient for this purpose.

To these ends the invention consists in the novel steps constituting my process which will be more fully disclosed hereinafter and particularly pointed out in the claims.

In carrying out my process I take a mixture of said nitrid $Al_2C_3N_6$ preferably in a state of fine division, and water, and subject it to the action of steam at about five atmospheres pressure in an autoclave or closed vessel, when the ammonia is given off in accordance with the following equations:—

$$Al_2C_3N_6 + 9H_2O = Al_2O_3 + 3CO_2 + 6NH_3$$

The pressure should be maintained at substantially five atmospheres, and for the reason that an emulsion of said nitrid in water heated above 100° C. forms melamin, $H_6C_3N_6$, substantially in accordance with the following equation:—

$$Al_2C_3N_6 + 3H_2O = Al_2O_3 + H_6C_3N_6$$

Under continued treatment above 100° C. in the presence of water melamin changes more or less to tri-cyan-triamid $(CN)_3.(NH_2)_3$, di-cyan-diamid $(CN)_2.(NH_2)_2$, and various polymers and isomers, such as cyanamid ($N \equiv C - NH_2$) and carbo-di-imid ($NH = C = NH$)

At temperatures above 100° C. substantially all of these compounds are volatile, and in an open vessel escape as vapors or gases. If, however, the digestion with water is carried out in a closed vessel and the pressure varied to substantially 5 atmospheres, when the temperatures will correspond to the boiling points of the solutions under such pressures, the volatile compounds cannot escape and are ultimately decomposed in substantial accordance with the following equations:—

1. $Al_2C_3N_6 + 3H_2O = Al_2O_3 + (CN)_3.(NH_2)_3$
2. $(CN)_3.(NH_2)_3 + 6H_2O = 3CO_2 + 6NH_3$

These two reactions go on together and if considered as a single reaction, they may be consolidated and stated as follows:—

$$Al_2C_3N_6 + 9H_2O = Al_2O_3 + 3CO_2 + 6NH_3$$

which is the equation above.

In other words, all of the fixed nitrogen in the said nitrid reaches as an end point the form of $NH_3$ which is the object of my process. The ammonia being disengaged in the presence of steam, the gases are condensed to form a weak solution of aqua-ammonia. If salts of ammonia are desired, the solution of aqua-ammonia thus obtained may be suitably treated with acids and the salts separated out as usual, or if a more concentrated aqua-ammonia or ammonium hydrate is desired, the ammonia may be separated out from the solution by any well known and approved process. The said nitrid, $Al_2C_3N_6$, employed in the above process may be obtained by suitably heating in a furnace a mixture of alumina and carbon in the presence of nitrogen, when the required nitrid is formed in accordance with the following equation:—

$$Al_2O_3 + 6C + 3N_2 = Al_2C_3N_6 + 3CO$$

all as is disclosed in my copending application Serial No. 650,973 filed September 23, 1911, and entitled: Process of producing compounds of aluminum, carbon, and nitrogen. In this process I take 102 parts by weight of finely divided alumina to 72 parts by weight of finely divided carbon, thoroughly mix the same and subject them in an atmosphere of nitrogen in a closed furnace, to a temperature sufficient to bring about the reaction. An excess of carbon of from 20 to 30 per cent. above these properties is also sometimes used. The actual temperature employed will vary with the total pressure maintained in the furnace, and also with the partial pressure of the carbon monoxid CO given off by the reaction. In my process above, I may use a temperature of about 1600° C. or less, a total pressure as low as 500 m.m. and a partial pressure of say 100 or 150 m.m., but the product can also be produced with higher total pressures accompanied by other partial pressures. The product produced by this process is also made the subject of my co-pending application #650,972 of even date herewith.

It is evident that those skilled in the art may vary the details of my process without departing from the spirit thereof, and therefore I do not wish to be limited to the above disclosure except as may be required by the claims.

What I claim is:—

1. The process of producing ammonia, which consists in subjecting the nitrid $Al_2C_3N_6$ to the action of steam at a pressure of substantially five atmospheres, substantially as described.

2. The process of producing ammonia, which consists in subjecting the finely divided nitrid $Al_2C_3N_6$ mixed with water to the action of steam at substantially five atmospheres pressure, substantially as described.

In testimony whereof, I affix my signature, in presence of two witnesses.

SAMUEL PEACOCK.

Witnesses:
T. A. WITHERSPOON,
GEO. B. PITTS.